Dec. 4, 1923.  
G. A. LYON  
BUFFER FOR MOTOR VEHICLES  
Filed Oct. 7, 1922

1,476,343

INVENTOR  
George Albert Lyon  
BY  
Harry L. Queen  
ATTORNEY.

Patented Dec. 4, 1923.

1,476,343

UNITED STATES PATENT OFFICE.

GEORGE ALBERT LYON, OF PHILADELPHIA, PENNSYLVANIA.

BUFFER FOR MOTOR VEHICLES.

Application filed October 7, 1922. Serial No. 592,939.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Buffers for Motor Vehicles, of which the following is a specification taken in connection with the accompanying drawing.

This application is a partial continuation of my applications Serial No. 438,294 filed January 19, 1921 and renewed Sept. 14, 1923 and Serial No. 496,828 filed August 30, 1921, that is this case contains subject matter taken therefrom.

This invention relates especially to resilient strip automobile buffers or bumpers of the general type covered by the Lyon Patent No. 1,198,246 of September 12, 1916 and in which the buffer front is formed with vertically wide contact portions which may be advantageously formed by bending or twisting parts of the buffer front strips so that they are vertically bent or displaced and may be brought, if desired, into substantial vertical alignment with the adjacent strips of the buffer front. One or both of the buffer front or impact receiving portions or strips may be bent upward or downward or may be both upwardly and downwardly bent or displaced with respect to the end portions of the buffer front and by bending or twisting the cross-over or meeting portions of these strips the lateral vertically wide contact portions may be brought more or less into vertical alignment with each other and may be held in this position by any suitable clamping devices such, for instance, as enclosing clips tightly secured around these front strips. Such buffer front or impact receiving portions may be formed with end loops projecting, if desired, out into protective position adjacent the automobile wheels and supported in any desired way from the automobile frame or other parts as by integral attaching members or strips which may be formed in connection with the end loops of the buffer.

In the accompanying drawing which shows in a somewhat diagrammatic way a number of illustrative embodiments of this invention:

Figure 1:
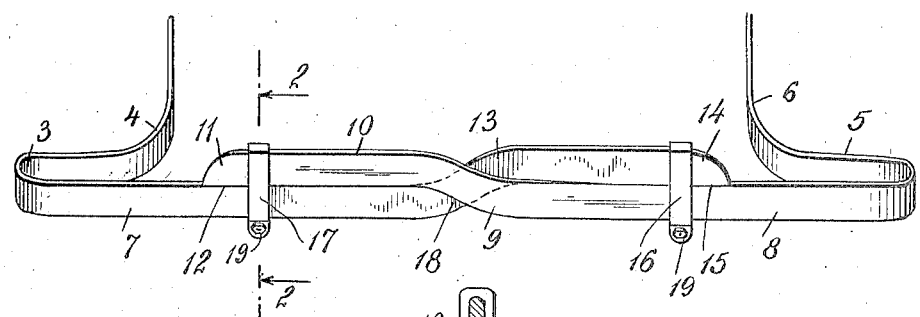
Fig. 1 is a front perspective view showing an illustrative buffer.
Figure 2:
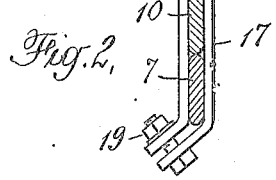
Fig. 2 is an enlarged transverse section thereof taken along the line 2—2 of Fig. 1, and Figs. 3 and 4 are front perspective views showing other illustrative buffers.

The buffer front is formed of two or more strips or plates of spring steel or other resilient material which may be bent up or otherwise formed into the desired shape, and in most cases it is desirable to form the buffer front of spring steel strip one-quarter to three-eighths of an inch thick or so and about two inches to three and one-half inches wide, depending on the stiffness and strength of the stock used and the particular service required. The buffer front may comprise end loops formed in such strips such as 3, 5 and the buffer front may be supported in any desired way from the automobile frame members. For instance, the buffer front strips may be continued inward and rearward to form integral attaching members 4, 6 which may be bolted or otherwise secured to the automobile. The buffer front may comprise vertically wide contact portions which may be substantially straight or level and may, if desired, be arranged substantially in edgewise alignment with the cooperating or adjacent portion of the other buffer front strip. The front strip or impact receiving portion 7 may, for example, have a bent or twisted cross-over portion 13 adjacent the center of the buffer so that the end portion 14 of this strip is brought substantially into the same vertical plane as the adjacent portion of the other front strip and its lower edge 15 may be in substantial contact with the other strip 8, if desired. The strip 8 may be carried inward in a substantially straight level manner to the bent cross-over or twisted meeting portion 9 where it is carried upward along the line 18 to form the upwardly displaced contact portion 10 which may be securely aligned vertically with respect to the cooperating lower strip 7 and may have its lower edge 12 in substantial contact with this lower strip, if desired. In this form of buffer front the ends of these upwardly displaced contact portions 11, 14 may be rounded or tapered off as indicated and the parts may be securely held in this vertically aligned position by suitable clamping devices such as 16, 17 which extend around these buffer strips as indicated in Fig. 2 and securely hold them together when the tightening bolts 19 are tightened.

Figure 3:
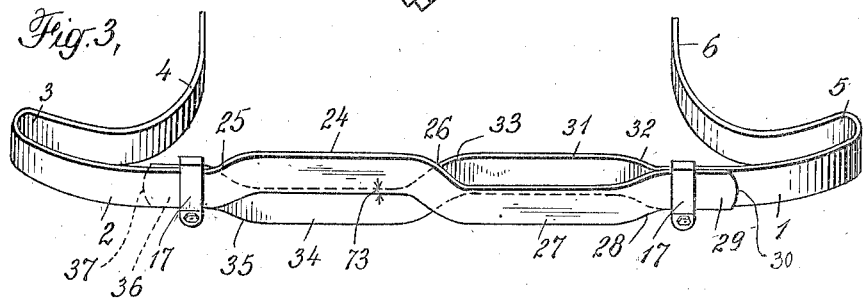

In the illustrative buffer shown in Fig. 3 similar end loops and attaching members are indicated as formed integral with the two buffer front strips which are employed and which comprise the lateral impact receiving portions 1, 2. In this case each of the buffer front strips may be both upwardly and downwardly bent or displaced with respect to the lateral impact receiving portions or connected end loops and this may be accomplished by forming adjacent the impact receiving member or portion 2, the upwardly bent or displaced contact portion 24 joined thereto by the bent portion 25. The strip adjacent the central part of the buffer may be bent down at 26, so as to form a downwardly bent or displaced contact portion 27 somewhat below the lateral impact receiving portions and joined to the end connecting portion 29 by the bend 28. The other or rear front strip may have the lateral impact receiving portion 1 and connected upwardly displaced contact portion 31 having at each end the bends 32, 33, the latter connecting with the downwardly displaced contact portion 34 which merges by the bend 35 into the end connecting portion 36. In this way the buffer front may have a vertical width of considerably over one and one half times the width of the front strips and yet be provided throughout this front impact receiving portion with edge overlapping stiffening portions such as 73 to increase the stiffness and strength of the buffer front. The connecting portions adjacent the strip ends 30, 37 may be permanently or adjustably connected as by the enclosing clips or clamping devices 17, so that ample lateral adjustment can be secured without losing the decided advantage of these edge overlapping stiffening portions of the strips.

Figure 4:
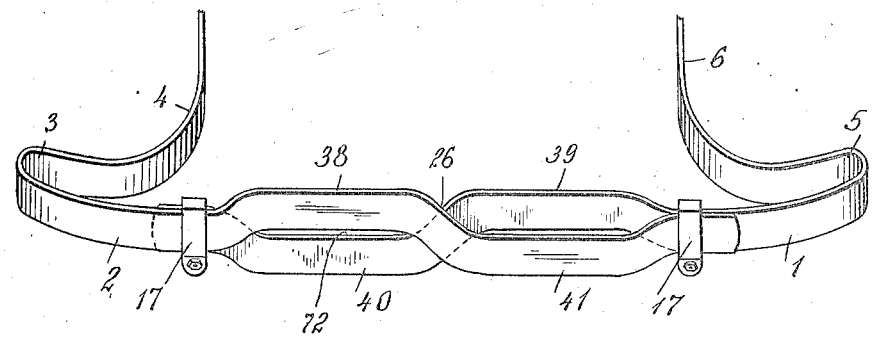

The buffer front shown in Fig. 4 may comprise two similar flat steel strips each of which may have an upwardly bent and a downwardly bent contact portion on opposite sides of the central or cross-over portion of the strip. Thus the strip or front impact receiving portion 2 of the buffer may have an upwardly bent contact portion 38 and a downwardly bent contact portion 41 on opposite sides of the cross-over or meeting portion 26 of the buffer front while the other strip or buffer front portion 1 may have an upwardly bent portion 39 and a downwardly bent contact portion 40 similarly located on each side of the meeting point or portion. By bending these buffer front strips at the meeting point and at the points where they have their other vertical bends the vertically wide contact portions or faces which may be separated a half an inch or an inch more or less to form the openings 72, if desired, may be brought into substantial vertical alignment at least near the central portions of these vertically wide contact faces on each side of the meeting point. Suitable clamping devices such as the enclosing clamps or clips 17 may be used to securely hold these buffer front strips in position so that they effectively reenforce each other under collision conditions.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. The automobile buffer front formed of a plurality of resilient steel strips and comprising end loops and an intermediate cross-over portion, said strips being bent inward and downward on opposite sides of said cross-over portion to bring the lateral vertically displaced horizontal contact portions of said strips into substantial vertical edgewise alignment and cooperating clamping means securely holding said strips in adjusted position.

2. The automobile buffer front formed of a plurality of resilient steel strips and comprising an intermediate cross-over portion, said strips being bent upward and downward on opposite sides of said cross-over portion to bring the lateral vertically displaced contact portions of said strips into substantial vertical edgewise alignment and cooperating clamping means securely holding said strips in adjusted position.

3. The automobile buffer formed of two wide spring steel strips and comprising end loops, a central cross-over portion and lateral vertically wide contact portions on each side of said cross-over portion, each of said strips being bent upward and downward on opposite sides of said cross-over portion to bring the lateral vertically displaced horizontal contact portions of the strip into substantial vertical alignment and contact with the adjacent portions of the other strip and clamping devices connecting the cooperating portions of said strips.

4. The automobile buffer formed of two wide spring steel strips and comprising a cross-over portion and lateral vertically wide contact portions on each side of said cross-over portion, each of said strips being bent upward and downward on opposite sides of said cross-over portion to bring the lateral vertically displaced horizontal contact portions of the strip into substantial vertical alignment with the adjacent portions of the other strip and clamping devices connecting the cooperating portions of said strips.

5. The automobile buffer formed of two wide spring steel strips and comprising integral attaching members and end loops, a central cross-over portion and lateral vertically wide contact portions on each side of said cross-over portion, each of said strips being bent adjacent said cross-over portion to bring the lateral vertically displaced contact portions of the strip into substantial vertical alignment with the adjacent portions of the other strip and clamping devices connecting the cooperating portions of said strips.

6. The automobile buffer formed of two steel strips and comprising integral attaching members and end loops, a central cross-over portion and lateral vertically wide contact portions on each side of said cross-over portion, each of said strips being bent adjacent said cross-over portion to bring lateral vertically displaced contact portions of the strip into substantial vertical alignment with the adjacent portions of the other strip.

7. The automobile buffer formed of a plurality of resilient steel strips and comprising attaching members, end loops and an intermediate cross-over portion, said strips being bent adjacent said cross-over portion to bring portions of the lateral vertically displaced contact portions of said strips into substantial vertical alignment and cooperating clamping means securely holding said strips in adjusted position.

8. The automobile buffer formed of a plurality of connected resilient steel strips and comprising attaching members, end loops and an intermediate cross-over portion, said strips being bent adjacent said cross-over portion to bring portions of the lateral vertically displaced contact portions of said strips into substantial vertical alignment.

9. The automobile buffer comprising a pair of connected resilient buffer front members of similar construction each member comprising an end loop, a bent central cross-over portion and a substantially straight portion on opposite sides of said cross-over portion and in different horizontal planes, each of said straight portions being in substantial vertical alignment with the cooperating straight portion of the other member.

10. The automobile buffer comprising a pair of connected buffer front members of similar construction each member comprising a bent cross-over portion and substantially straight portions on opposite sides of said cross-over portion and in different horizontal planes, each of said straight portions being in substantial vertical alignment with the cooperating straight portion of the other member.

11. The automobile buffer comprising two connected resilient impact receiving members formed of steel strip and each having an end loop and a rearwardly extending attaching member adapted to be connected to the automobile, the front portions of said members crossing each other and having substantially horizontal lateral contact portions on opposite sides of the crossing area which have substantially vertically aligned adjacent portions.

12. The automobile buffer comprising two cooperating resilient impact receiving members and each having an end loop and a rearwardly extending attaching member adapted to be connected to the automobile, the front portions of said members crossing each other and having substantially horizontal contact portions on opposite sides of the crossing area which have substantially vertically aligned portions.

13. The automobile buffer comprising two resilient impact receiving members formed of steel strip and each having an end loop and a rearwardly and inwardly extending attaching member to be connected to the automobile, the front portions of said members crossing each other adjacent the center of the buffer front and having vertically displaced substantially horizontal contact portions on opposite sides of the crossing area which are substantially vertically aligned with each other.

14. The automobile buffer comprising two resilient impact receiving members formed of steel strip and each having a rearwardly extending attaching member to be connected to the automobile, the front portions of said members crossing each other and having vertically displaced substantially horizontal contact portions on opposite sides of the crossing area which are substantially vertically aligned with each other.

GEORGE ALBERT LYON.